(12) United States Patent
Friman et al.

(10) Patent No.: US 7,551,934 B2
(45) Date of Patent: Jun. 23, 2009

(54) CELL SELECTION IN A COMMUNICATIONS SYSTEM

(75) Inventors: Leif Friman, Järvenpää (FI); Johanna Pekonen, Espoo (FI); Harri Jokinen, Hiisi (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/240,677

(22) PCT Filed: Apr. 2, 2001

(86) PCT No.: PCT/IB01/00652

§ 371 (c)(1),
(2), (4) Date: Apr. 3, 2003

(87) PCT Pub. No.: WO01/76273

PCT Pub. Date: Oct. 11, 2001

(65) Prior Publication Data

US 2003/0153317 A1      Aug. 14, 2003

(51) Int. Cl.
*H04W 4/00*      (2006.01)

(52) U.S. Cl. .................................................. 455/466

(58) Field of Classification Search .............. 455/446, 455/422.1, 435, 436, 443, 524, 430, 511, 455/517, 421, 425, 426, 452.2

See application file for complete search history.

(56) References Cited

U.S. PATENT DOCUMENTS

| | | | |
|---|---|---|---|
| 5,129,097 A | 7/1992 | Suzuki et al. | |
| 5,497,504 A | 3/1996 | Acampora et al. | |
| 5,642,398 A | 6/1997 | Tiedemann et al. | |
| 5,659,598 A | 8/1997 | Byrne et al. | |
| 5,842,128 A | 11/1998 | Takasawa et al. | |
| 5,943,334 A | 8/1999 | Buskens et al. | |
| 6,047,176 A * | 4/2000 | Sakamoto et al. | 455/422.1 |
| 6,314,294 B1 * | 11/2001 | Benveniste | 455/452.2 |
| 6,377,803 B1 * | 4/2002 | Ruohonen | 455/434 |
| 6,504,884 B1 * | 1/2003 | Zvonar | 375/346 |
| 2001/0036827 A1 * | 11/2001 | Edlund et al. | 455/432 |

FOREIGN PATENT DOCUMENTS

| | | |
|---|---|---|
| EP | 1 079 656 A | 2/2001 |
| WO | WO 96/34500 | 10/1996 |
| WO | WO 98/59513 | 12/1998 |

OTHER PUBLICATIONS

European Search Report, Application No.: EP 08 16 2338, Date of Completion: Oct. 6, 2008, Date of Mailing: Oct. 16, 2008, pp. 1-8.

* cited by examiner

*Primary Examiner*—Melody Mehrpour
(74) *Attorney, Agent, or Firm*—Squire, Sanders & Dempsey, LLP (57) ABSTRACT

A communications system comprising a first plurality of cells operating in accordance with a first mode and a second plurality of cells operating in accordance with a second mode, each of said cells being served by a respective first station, at least one second station arranged to establish a connection with at least one first station, said at least one second station being associated with said first plurality of cells or said second plurality of cells during said connection and means for determining which plurality of cells said second station is associated after said connection has been completed.

44 Claims, 3 Drawing Sheets

CELL SELECTION IN A COMMUNICATIONS SYSTEM

FIELD OF THE INVENTION

The present invention relates to a communications system and method. In particular, but not exclusively, the present invention relates to a dual mode wireless cellular communications system.

BACKGROUND OF THE INVENTION

In known wireless cellular telecommunication networks, an area covered by a network is divided into a plurality of cells. Each of these cells has a base station which is arranged to transmit signals to and receive signals from mobile stations located in the cell associated with the respective base station. Mobile stations will be in active communication with the base station associated with the cell in which the mobile station is located.

A number of different cellular telecommunication standards are used or have been proposed. One such standard is the GSM (Global System for Mobile Communications) standard. GSM uses a frequency/time division multiple access technique. A mobile station is allocated a given frequency band and time slots in order to transmit to the base station. The mobile station is allocated a different frequency band and time slots to receive signals from the base station. The allocated frequency band and time slots can be changed over time.

There are a number of different frequency bands at which GSM can be used. For example, one frequency is around 900 MHz. This will be referred to as GSM 900. Another frequency is around 1800 MHz This will be referred to as GSM 1800.

A third generation standard has been proposed and is referred to as UMTS (Universal Mobile Telecommunications System). UMTS uses a code division multiple access technique. With the proposed UMTS system, soft handoff has been proposed. With soft handoff, a mobile station is in communication with more than one base station at the same time.

It is possible that networks using different standards can cover the same area. As the different standards use different methods of access and/or different frequencies, the different networks do not interfere. Multiband mobile phones operate on more than one frequency band of the same standard. Dual mode mobile phones have been proposed particularly in the context of the GSM and UMTS standards. Accordingly, one dual mode mobile station is able to communicate with a network using the GSM standard and a network using the UMTS standard. A multiband mobile station is able to communicate e.g. either on a GSM 900 network or on a GSM 1800 network. At any one time the mobile station will be connected to only one network. In the GSM standard, it is stated that when a mobile station completes a connection and is in an idle mode, the mobile station camps on the cell whose channel has been released. In other words, the mobile station remains associated, in the idle mode, with the cell with which it has just completed a connection. This is sometimes disadvantageous in that the cell with which the mobile station is associated may not be the most appropriate cell. In order to change the cell with which the mobile station is associated or camping on, a cell reselection procedure has to be carried out. This can be a complicated procedure especially if the mobile station is changing from one network to another. A network operator requires extensive experience in parameter setting.

In the GSM standard, parameters are defined for the cell re-selection procedure. With these parameters, which are set by the operator and broadcast on the BCCH/PBCCH of the cell, the mobile station is able to find out, which cell should be considered as the best cell and whether a cell re-selection shall be proceed.

These parameters are, for example, offsets to the measured signal strengths of the serving cell and neighbour cells to get the mobile station to camp on the wanted cell. The wanted cell may also belong to a different location area compared to the cell where the connection was released. Assuming that the call was initiated in one network (e.g. GSM 900) but the mobile station was handed over to another network (e.g. UMTS), typically the mobile station should perform a location update procedure on the cell where the call was released. If then the operator prefers mobile stations to camp on the GSM system in idle mode, then the mobile station would reselect another cell from the GSM network and would again typically perform a location update. This slows down the reselection of the intended cell and adds unnecessary signalling.

SUMMARY OF THE INVENTION

It is an aim of embodiments of the present invention to address the problems with the known arrangements.

According to a first aspect, there is provided a communications system comprising a first plurality of cells operating in accordance with a first mode and a second plurality of cells operating in accordance with a second mode, each of said cells being served by a respective first station, at least one second station arranged to establish a connection with at least one first station, said at least one second station being associated with said first plurality of cells or said second plurality of cells during said connection and means for determining which plurality of cells said second station is associated after said connection has been completed.

Preferably, the communications system comprises at least one network to which said second station is attachable, said first stations being part of said at least one network, wherein said at least one network is arranged to determine the plurality of cells to which said second station is to be associated.

According to a second aspect, there is provided a communications system comprising a first plurality of cells operating in accordance with a first mode and a second plurality of cells operating in accordance with a second mode, each of said cells being served by a respective first station, at least one second station arranged to establish a connection with at least one first station, and means for controlling which at least one cell said second station is associated when said second station is idle.

According to a third aspect, there is provided a communications system comprising a first plurality of cells operating in accordance with a first mode and a second plurality of cells operating in accordance with a second mode, each of said cells being served by a respective first station, at least one second station arranged to establish a connection with at least one first station, said at least one second station being associated with said first plurality of cells or said second plurality of cells during said connection and means for controlling if the second station is associated with at least one cell operating in accordance with the first mode or at least one cell operating in accordance with the second mode, after said connection has been completed.

According to a fourth aspect, there is provided a communications method for a communications system comprising a first plurality of cells operating in accordance with a first mode and a second plurality of cells operating in accordance with a second mode, each of said cells being served by a respective first station, said method comprising the steps of: establishing a connection between a second station and at least one first station; releasing the connection between the first and second station; and selecting if the second station is to be associated with a cell operating in accordance the first mode or the second mode.

According to a fifth aspect of the present invention, there is provided a communications system method for a communications system comprising a plurality of cells; each of said cells being served by a respective first station and at least one second station, said method comprising the steps of: establishing a connection between at least one first station and a second station, said at least one second station being associated with a first cell during said connection; and controlling which cell said second station is associated with in idle mode after said connection has been completed.

According to a further aspect of the invention, there is provided a network element of a communications system comprising a plurality of cells, each of said cells being served by a respective first station, at least one second station arranged to establish a connection with at least one first station, said at least one second station being associated with a first cell during said connection, said network element comprising means for controlling which cell said second station is associated with in idle mode after said connection has been completed.

According to a further aspect of the invention, there is provided a first station of a communications system comprising a plurality of cells, each of said cells being served by a first station, at least one second station arranged to establish a connection with at least one first station, said at least one second station being associated with a first cell during said connection, said first station comprising means for controlling which cell said second station is associated with in idle mode after said connection has been completed.

According to a further aspect of the present invention, there is provided a second station of a communications system comprising a first plurality of cells arranged to operate in accordance with a first mode and a second plurality of cells arranged to operate in accordance with a second mode, each of said cells being served by a first station, said second station arranged to establish a connection with at least one first station, said second station being associated with a first cell during said connection, said second station being arranged to receive information for controlling which plurality of cells said second station is associated.

According to a further aspect of the present invention, there is provided a communications system comprising a plurality of cells, each of said cells being served by a respective first station;

at least one second station arranged to establish a connection with at least one first station;

said at least one second station being associated with a first cell during said connection; and means for controlling which cell said second station is associated with in idle mode after said connection has been completed.

BRIEF DESCRIPTION OF DRAWINGS

For a better understanding of the present invention and as to how the same may be carried into effect, reference will now be made by way of example only to the accompanying drawings in which:—

DETAILED DESCRIPTION OF EMBODIMENTS OF THE PRESENT INVENTION

Figure 1:
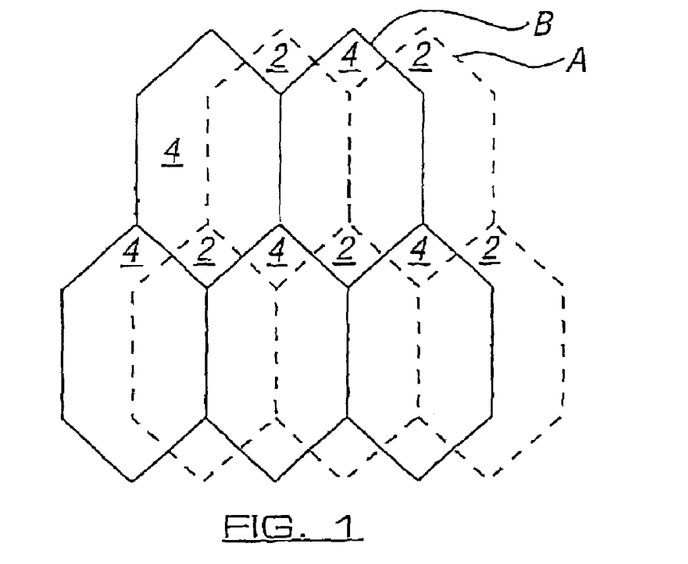
FIG. 1 shows two overlapping networks.

Reference will first be made to FIG. 1, which shows a first set of cells with radio access mode 1 (cells A) and a second set of cells with radio access mode 2 (cells B). For simplicity, the cells with radio access mode 1 are referred to as network A and cells with radio access mode 2 as network B. However, it should be noted that at least parts of networks A and B may be integrated. For example, the connection management function such as the mobile services switching centres MSC for the networks may be implemented in a single mobile services switching centre MSC. The networks may be separate networks or a single network which uses two different radio access technologies. As can be seen from FIG. 1, the two networks A and B cover the same area. The first network A is divided into a plurality of cells 2. The second network B is also divided into a plurality of cells 4. It should be appreciated that the cells in the two networks can be the same or different sizes. Likewise, the cell shapes can be the same or different. The cells of the networks may coincide or may be in different locations.

In the preferred embodiment of the present invention, network A is in accordance with a GSM standard whilst network B is in accordance with a UMTS standard.

However, it should be appreciated that in alternative embodiments of the present invention, the two networks may be in accordance with any two standards. For example, networks A and B could be GSM 900 and GSM 1800 respectively Embodiments of the present invention will be described in the context of two overlapping networks. However, it should be appreciated that embodiments of the present invention can be used where there are more than two overlapping networks. It should be appreciated that in embodiments of the present invention, the area covered by each network may only partially overlap.

Figure 2:
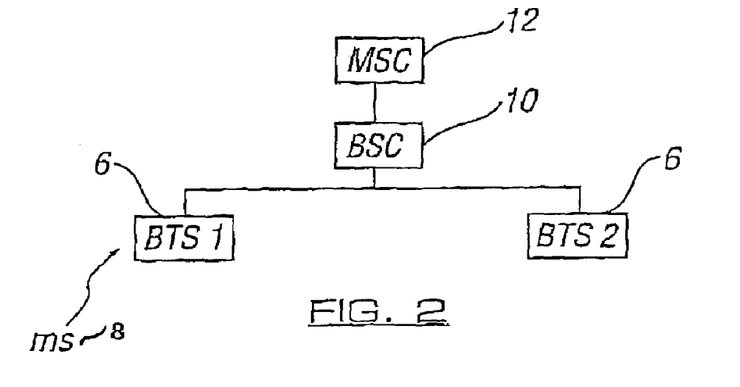
FIG. 2 shows the hierarchy of a GSM network.

Reference is made to FIG. 2, which shows the hierarchy of the elements in network A Each cell 2 is served by a base transceiver station 6. In FIG. 2, two base stations 6 are shown. However, it should be appreciated that in practice there will be many more base stations. A mobile station 8 is arranged to communicate with the base transceiver station of the cell in which the mobile station is currently located. In practice, each base transceiver station 6 will be in communication with a number of different mobile stations. The two base stations 6 shown in FIG. 2 are connected to a base station controller 10. The base station controller 10 is arranged to control the two base transceiver stations 6. In practice, a number of base station controllers are provided. Accordingly, neighbouring base stations may be connected to different base station controllers.

The base station controllers 10 are in turn controlled by a mobile services switching centre MSC 12. Again, more than one mobile services switching centre 12 are generally provided and those mobile services switching centres 12 are arranged to communicate with each other. The mobile services switching centre deals with circuit switched data, Network elements (such as a serving GPRS support node SGSN) may alternatively or additionally deal with packet switched data. The mobile services switching centre MSC and serving GPRS support node SGSN and gateway GPRS support node GGSN build with the home location register HLR and the visitor location register VLR a core network. Also the future voice over Internet protocol VoIP and other Internet protocol networks can be supported. In VoIP or other IP, the functionality of a mobile services switching centre MSC is implemented in a circuit switched call function CSCF.

The connection between the mobile station 8 and the associated base station 6 will be via a radio connection. The connection between the base stations and the base station controller and between the base station controller and the mobile services switching centre will generally be via wired connections although in some alternative embodiments the connections may be wireless connections.

Figure 3:
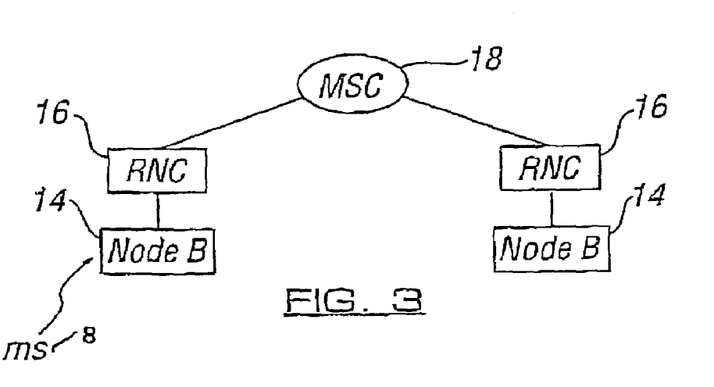
FIG. 3 shows the hierarchy of a UMTS network.

Reference is made to FIG. 3 which shows the elements of the UMTS network B. Each cell 4 is served by a node B 14. Functionally, node B is equivalent to the base station of FIG. 2 although different terminology is used in relation to the UMTS standard. For the purpose of this document, where appropriate, the term base transceiver station should be interpreted to cover the base transceiver station of FIG. 2 and node B of FIG. 3 and any other functionally equivalent element.

As with the arrangement of FIG. 2, a mobile station 8 is arranged to communicate with node B 14 via a radio connection. Each node B 14 is controlled by a radio network controller 16. In the arrangement shown in FIG. 3, two radio network controllers are provided. In practice, each radio network controller 16 will control more than one node B. The radio network controller 16 is again functionally equivalent to the base station controller 10. Accordingly, the term base station controller in this document, is to be interpreted where appropriate as including the base station controller 10 of FIG. 2 and the radio network controller 10 of FIG. 3 or any other functionally equivalent element The radio network controllers are each connected to a mobile services switching centre 18 which is functionally similar to the mobile services switching centre 12 of the GSM network.

It should be appreciated that the network shown in FIG. 3 may also have components to support packet switched connections, voice over Internet protocol connections and Internet protocol connections.

The mobile station 8 is a dual mode mobile station. This means that the mobile station is able to communicate with the GSM network or the UMTS network. In embodiments of the present invention, the mobile station is only connected to one of the networks at a time.

Each mobile station has effectively three different states. In the first state, the mobile station is off and is unable to communicate with either of the networks In a second state, the mobile station is actively connected to a base station or node B. In this active connection, data is exchanged between the mobile station and the base station or node B. This date can take the form of voice data or any other type of data. In other words, a call is established between the mobile station and the base station or node B in the third state, the mobile station is not engaged in a call and is in an idle mode. However, the mobile station is still associated with one of the base stations or node B. The embodiments of the invention which are described hereinafter are concerned with the selection of the cell with which the mobile station is associated when the mobile station completes a call and changes to the idle state.

Figure 4:
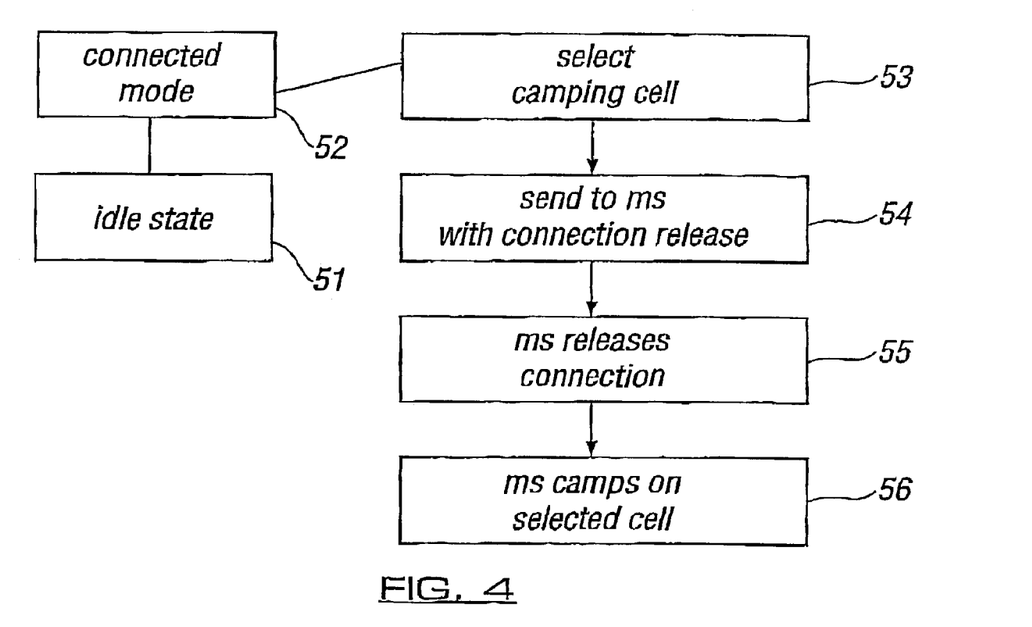
FIG. 4 shows a first method embodying the present invention.

Reference will now be made to FIG. 4 which shows a first embodiment of the present invention. In step S1, the mobile station is initially in an idle state. In step S2, the mobile station establishes a connection to a third party.

In step S3 a network element determines the cell with which the mobile station 8 is to be associated when a call connection is released. This network element will be a network element upstream of the base station or node B with which the mobile station is currently connected. For example, in the case of a GSM network where the mobile station 8 is connected to a base transceiver station 6, the base station controller and/or the mobile services switching centre 12 will select the cell. If the mobile station 8 is connected to node B 14 of the UTMS network, then the radio network controller 16 and/or the mobile services switching centre 18 will select the cell or the radio access technology with which the mobile station is to be associated when the call connection is released. It should be noted that it is only possible to select a cell of the network to which the mobile station is currently connected. If the networks share components or communicate, then it is possible for cells of either network to be selected. If the mobile station is to be associated with a cell of the other network, then the method of FIG. 5 may be performed.

It should be appreciated that in alternative embodiments of the present invention, network elements may make the decision as to the cell or the radio access technology with which the mobile station is to be associated.

Any suitable criteria may be used in order to select the cell. For example, received measurement reports may be used. The measurement reports may be signals received by the mobile station from the strongest base stations. Alternatively, the measurement reports may be based on signals received by the base station with which the mobile station is currently connected and possibly neighbouring base stations.

Alternatively, there may be a specific algorithm used by the network which can use geographical location information in order to select the cell. The network can request the geographical information from the mobile station or perform measurements in order to find out the location of the mobile station. In the GSM standard, there is a location services LCS feature This defines different methods for positioning a mobile station. Alternatively, the cell can be selected using some subscriber specific data stored in the network, such as Support of Localised Service Area SoLSA information in which user specific cell groups can be specified. These cells are called SoLSA cells and can be used for tariffing and/or for having different cell re-selection behaviour for different subscribers in the same area.

Once the cell with which the mobile station is to be associated once the connection has been released has been determined, this cell information is sent to the mobile station in step S4. In one preferred embodiment of the present invention, the cell information is included in the connection release message. This message is the channel release message in a GSM system and the radio resource control connection release message in a UMTS system. The cell information is included in an optional block with the connection release message. The content of this optional block may be subscriber specific. For example the SoLSA information can effect the content so that different subscribers can be ordered to different cells or Radio Access Technologies RAT. Another case might be that all the roaming subscribers are, if possible, kept in GSM cells in the idle mode and only based on the requested service handed over to the UMTS cell. The non roaming subscribers may camp in any cell in idle mode.

In step S5 the mobile station releases the connection with the base station or node B.

In step S6 the mobile station camps in the selected cell. The mobile station will periodically send messages to the base station or node B of the selected cell and will periodically receive messages from the base station or node B of that selected cell. Messages may be sent only if the location of the mobile station is changed. Alternatively, messages may be sent more regularly.

Figure 5:
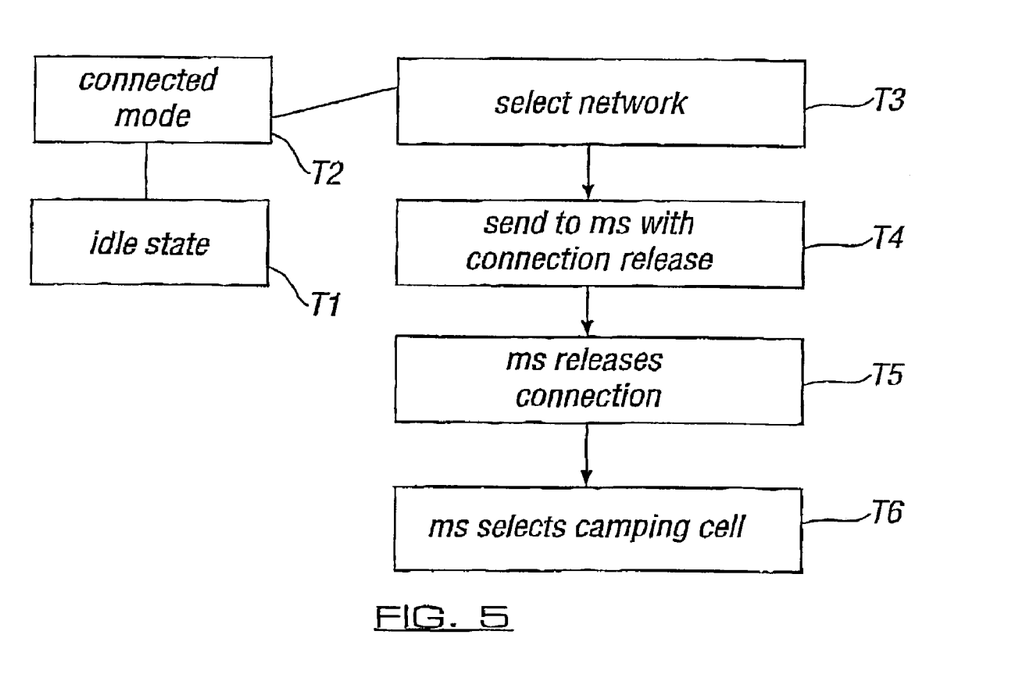
FIG. 5 shows a second method embodying the present invention.

Reference will now be made to FIG. 5 which shows an alternative embodiment of the invention. As mentioned previously, the method of FIG. 5 may be used if it is decided that a mobile station is to camp on a cell of the network to which the mobile station is not currently connected. It should also be appreciated that the embodiment shown in FIG. 5 can also be used independently of the method shown in FIG. 4.

In step T1, the mobile station is initially in an idle state. In step T2, the mobile station establishes a connection to a third party.

In the next step T3, a network element selects the network to which the mobile station is to be associated when a connection has been released. The network element can be the mobile services switching centre 12 or the base station controller 10 if the mobile station is currently connected to a base station of the GSM standard. Alternatively, if the mobile station is currently connected to node B of a UMTS system, the radio network controller 16 or mobile services switching centre 18 may make the decision. For example, all dual mode mobile stations may always be ordered to a cell of a particular network. For example, a mobile station may always be ordered to a GSM cell. Alternatively, the network can be selected on the basis of the relative traffic on the two networks. In order to make this selection, this will require some communication between the two networks. Yet another possibility is that the selection of the cell may depend on the forecasted movement of the mobile station. For example, if the mobile station on the basis of the measurement reports received seems to be moving out of the coverage of the UMTS system, the mobile station may be ordered to camp in the GSM system and listen to the signals of GSM base stations. The network, which is selected for camping, may be dependent on the coverage. For example, the mobile station will select the available network if only one network is provided in a particular area.

The mobile station may be ordered to camp in a cell of its current location area or in a cell of a different location area. The cell selection information for the mobile station may be accurate to a cell, a location area, a frequency band, a network, or any other level of accuracy.

Information on the network, which is selected, is sent to the mobile station in the connection release message in step T4. This is similar to the cell identity sent in the connection release message in the embodiment of FIG. 4.

In step T5, the mobile station releases the connection. In step T6, the mobile station selects the camping cell. The mobile station may select the cell based on measurements which it has made. In particular, the camping cell may be selected based on the measurement of signals from a number of base stations. The base station which is received most strongly is selected. Similarly if the network is the UMTS network, then the mobile station may consider the signals of node B. It should be appreciated that the mobile station may make new measurements or may make the decision based on measurements made when the mobile station was connected to node B or the base station.

Figure 6:
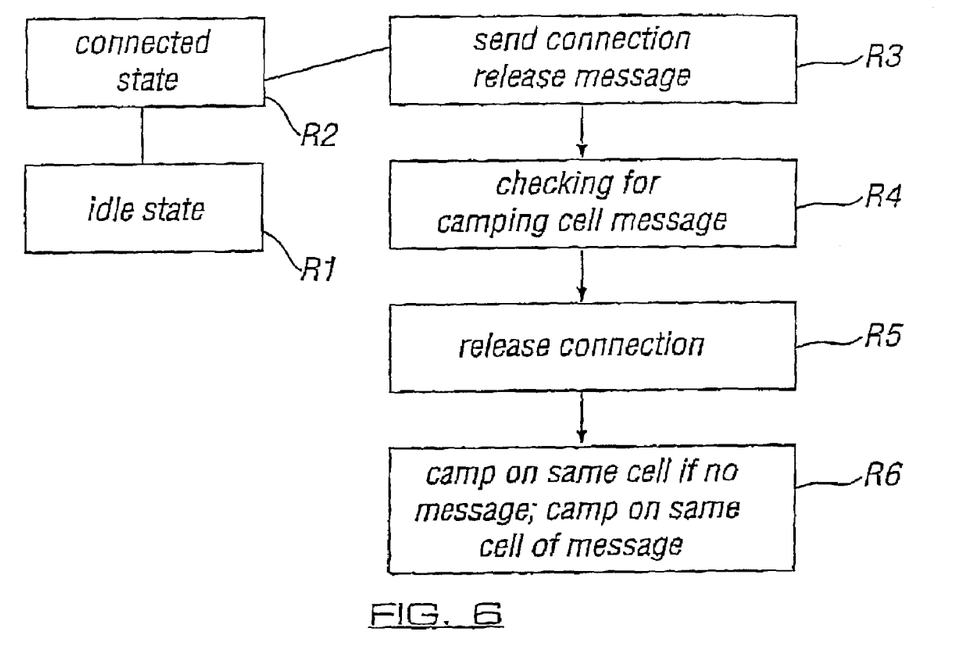
FIG. 6 shows a third method embodying the present invention.

A third embodiment is described in FIG. 6. In the arrangement shown in FIG. 6, the message indicating the camping cell or the network to be used is sent separately from the connection release message. In step R1, the mobile station is initially in an idle state. In step R2, the mobile station establishes a connection to a third party. In step R3, the connection release message is sent to the mobile station.

In step R4, the mobile station checks to see whether or not it has received a message indicating the cell with which the mobile station is to be associated once the connection has been released or the network. In step R5, the connection is released by the mobile station. In step R6, if the message has been received, the mobile station is associated with the identified cell. Alternatively, if the message indicates the network, the mobile station will select the cell with which the mobile station is to be associated, as in the method of FIG. 5. However, if the message is not received, the mobile station will remain associated with the cell with which it has just released the connection.

It should be appreciated that the various steps shown in the methods of FIGS. 3, 4 and 5 can be performed in different orders to those illustrated in the Figures. The mobile station is described as releasing the connection. It is of course possible that the node B or base station can control the release of the connection.

In embodiments of the present invention, when a connection is released, the mobile station is attached to the selected cell. This is unlike the prior art where the mobile station is attached to the cell to which it was previously connected. In order to change the cell in the prior art, a cell selection procedure takes place.

Embodiments of the present invention are able to reduce the required paging capacity. For example, if all the dual mode mobile stations are always associated with, for example a GSM cell after a connection has been released, the GSM cells will not need to broadcast any UTMS cell information and paging messages for these dual mode mobiles need not be sent on the UMTS network. It is of course possible that all dual mobile stations will always use the UTMS network. Accordingly in preferred embodiments of the present invention, one network is preferred for camping, provided there is of course coverage by that network. In this way, a mobile station can be first paged on the preferred network. However, it is possible in alternative embodiments of the present invention to page on both networks at the same time or to page on the different networks at different times. Location updates for a mobile station may be done when the system is changed, and thus the page can be done to the system in which the mobile is camping.

The cell selection decision may use one or more of the following pieces of information; the received measurement reports, in which case the decision would usually be made by the BSC or radio network controller, geographic location information, in which case a decision may be made in the MSC, BSC/RNC or SMLC (Serving Mobile Location Center). The decision may be based on cell information, again the decision will be made either in the MSC or in the BSC/RNC. If the decision is based on subscriber specific data, the decision may be made in the MSC and the BSC or radio network controller. The information on the decided cell or network may be sent from the mobile services switching centre to the base station controller or the radio network controller and the information as to the cell or network may be included in the call release message by the base station controller or the radio network controller. In different embodiments of the present invention, it is possible for any one or more elements of a network to make the required decision.

Embodiments of the invention provide greater control over the networks. Different subscribers will have different needs. For example some subscribers may use mainly voice calls whilst others may almost entirely use video calls or data calls.

The traffic load situations will depend on these needs. Embodiments of the invention allow the network operator to optimise the call establishment traffic to take place in the network which will be used in the actual call. The number of inter network handovers can be reduced.

Embodiments of the present invention have been described as controlling the cell with which the mobile station is associated with after a connection has been released. Embodiments of the invention can be used when a mobile station is first switched on, prior to a call being established. This may be the case of the connection of the location update.

The mobile station can be any suitable user equipment and may be a mobile telephone, a portable computer or any other piece of wireless equipment.

The default cell to be selected after channel release may be instead of the same cell:

a different cell on the same network (on the same or on a different band); and different cell on another network.

The location area may be the same or a different one from the area of the released cell.

The cell selection information for the mobile station may be accurate to a cell, a frequency band, a network, or the like.

The mobile station MS may, during a call, optionally be handed over to another cell (which may be on another location area compared to the initial state cell or even on another network/system. In some special cases the location area could be the same in different networks). Several hand overs may occur during the call. Then at the channel release the mobile station MS may optionally receive additional information about the cell to be selected when entering again idle mode.

Embodiments of the invention may be useful when all mobiles are set to select for example, GSM in idle mode while they may use UMTS in connected mode, or vice versa. Embodiments of the invention may be useful also for example in a single band GSM system. For example, embodiments of the invention may be used in the case that the mobile station MS is forwarded to a neighbouring cell with a directed retry if the camped cell has overload. Then at the channel release, assuming the mobile station MS has not moved, the mobile station MS may be directly assisted to select the cell it was camped on before the call. This again is useful in the case that the two cells are from a different location area when two unnecessary location updates may be avoided.

Figure 7:
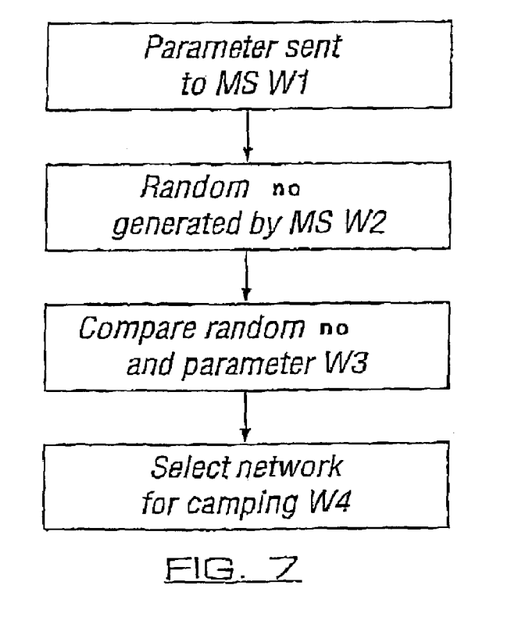
FIG. 7 shows a fourth method embodying the present invention.

Reference will now be made to FIG. 7, which shows an alternative embodiment of the invention. Aspects of this method may be used with the methods described earlier and vice versa.

In the first step W1, the mobile station receives from the network a value. This value is a parameter which defines the preferred statistical distribution of the mobile stations between two networks, systems or the like. This value is provided to the mobile station during the connection release signalling. The value is determined by the controllers of the two networks. Some networks or systems may have a common controller. Each network can provide the same or different values to the mobile stations. In preferred embodiments, the mobile station is arranged to only one value from the network or system to which it is connected during a call or the like. In one embodiment the value can be defined as a value between 0 and 1. However, the range from which the value can be selected can take any other suitable values.

In the second step W2, the mobile station generates a random number. The random number is selected from the same range from which the value is selected. Thus in one embodiment of the invention, the range from which the random number is selected is between 0 and 1. Any suitable method can be used to generate the random number.

In the third step W3, the mobile station compares the received parameter value with the random number generated. If the random number is greater than the parameter, one network is selected whilst if the random number is lower than the parameter the other network is selected. For example if the parameter has the value 0.3, the random number 0.2 would result in one network being selected and if random number is 0.7 then the other network would be selected. The result of this is that because the mobile station generates the random number randomly, 0.3×100, that is 30% of the time the one network is selected with the other network being selected (1−0.3)×100, that is 70% of the time.

In the fourth step W4, a cell in the selected network is camped on by the mobile station in its idle state. This involves the mobile station identifying which cell of the selected network should be camped on.

It should be appreciated that a network can be selected for camping only if there is a cell available. For example, at a given location, only one network may be available and the mobile station will camp on that network regardless of any statistical parameter. If a mobile station is instructed to camp on a particular network and it is not possible to camp on that network due to any reason, the mobile station will camp on the other network.

In embodiments of the present invention it is possible to agree that the border values of the parameter zone mean a forced selection. For example, the parameter may be defined by 3 bits which define 8 values The first and last values result in a respective one of the networks being camped on. The intervening 6 values define statistical values and are used in the same way as the statistical parameter as described previously.

The parameter can be sent to the mobile station when a call is being released, when the channel used for the location area change based location update is being released or at any other appropriate time. In order to prevent a plurality of inter system location updates, it may be preferred not to provide the parameter when the first location updates are made to the system. A similar operation can be achieved once a call has been terminated in alternative embodiments of the present invention.

This embodiment has the advantage that the network is able to control the paging and location update loads of the two networks or systems. Embodiments of the invention have the advantage that the control is easier for the networks or systems. This is because the networks or systems no longer need to make a decision on a mobile station by mobile station basis but instead gives a statistical value common for all the mobile stations or a subgroup of mobile stations such as business users, a particular type of user or a particular type of mobile station.

Thus in embodiments of the invention the network or networks may determine the plurality of cells on which the mobile station camps. The decision is thus made on the network side and not by the mobile station. The information defining which plurality of cells that mobile station is to be associated when idle is sent from the network to the mobile station. This information is sent to the Mobile station in the connection release signalling or message.

The parameter can be location dependent and take into account the loading conditions in the two systems. In alternative embodiments, the parameter may be location independent.

Embodiments of the present invention can be used where there are two or even more radio access techniques, such as GSM and UMTS. Embodiments of the present invention can be used where there are two or even more frequency zones such as GSM 900 and GSM 1800. Embodiments of the present invention are particularly advantageous where the same operator controls both systems. However in alternative embodiments of the present invention, different operators may control the two systems.

Embodiments of the present invention can be used with more than two systems. For example, a first parameter can be sent which determines which radio access technique is to be used. A second parameter can also be sent which determines the frequency. Alternatively two or more parameters can be sent which define ranges. For example, if the parameters a and b were sent to the mobile station, a random value between 0 and a would select one system, a value between a and b would select a second system and a value between b and 1 would select a third system.

The invention claimed is:

1. A system, comprising:
    a first plurality of cells operating in accordance with a first mode and a second plurality of cells operating in accordance with a second mode, each of said cells being served by a respective first station, at least one second station configured to establish an active connection with at least one first station, said at least one second station being associated with said first plurality of cells or said second plurality of cells during said active connection; and
    a selecting unit configured to send information in a channel release message to said second station for selecting which plurality of cells said second station is to camp on when said second station changes to an idle state after said active connection has been released.

2. The system as claimed in claim 1, wherein said selecting unit is configured to provide a statistical parameter to said second station, said second station being configured to use said parameter to determine which plurality of cells said second station is to camp on after said active connection has been released.

3. The system as claimed in claim 2, wherein said second station is configured to generate a random number and to compare the random number with the statistical parameter from which the plurality of cells with which said second station is to camp on is determined.

4. The system as claimed in claim 3, wherein the statistical parameter is selected from a first range of values and second station is configured to generate the random number from the first range of values.

5. The system as claimed in claim 1, wherein the selecting unit is configured to provide the same statistical parameter to a plurality of second stations.

6. The system as claimed in claim 5, wherein said selecting unit is configured to provide the same statistical parameter to a subgroup of said second stations, based on a characteristic associated with said second stations.

7. The system as claimed in claim 1, wherein said first and second plurality of cells are on different frequency bands.

8. The system as claimed in claim 1, wherein said first and second plurality of cells use different radio access technology.

9. The system as claimed in claim 1, wherein said first and second plurality of cells are on different location areas.

10. The system as claimed in claim 1, wherein said first and second plurality of cells are on different networks.

11. The system as claimed in claim 1, wherein said second station is configured to select a cell of the selected plurality of cells.

12. The system as claimed in claim 1, wherein said second station uses measurements made during the active connection to select a cell.

13. The system as claimed in claim 1, wherein said communications system is a wireless communications system.

14. The system as claimed in claim 1, wherein said first station is a base station.

15. The system as claimed in claim 1, wherein said at least one second station is a mobile station.

16. The system as claimed in claim 1, wherein said first and second plurality of cells use first and second standards respectively.

17. The system as claimed in claim 16, wherein one of said first and second standards is a frequency division multiple access standard.

18. The system as claimed in claim 16, wherein one of said first and second standards is a time division multiple access standard.

19. The system as claimed in claim 16, wherein one of said first and second standards is a code division multiple access standard.

20. The system as claimed in claim 16, wherein one of said first and second standards is a global system for mobile communications standard.

21. The system as claimed in claim 16, wherein one of said first and second standards is a universal mobile telecommunications system standard.

22. The system as claimed in claim 1, wherein said communications system comprises at least one network to which said second station is attachable, said first stations being part of said at least one network, wherein said at least one network is configured to determine the plurality of cells to which said second station is to camp on.

23. A system, comprising:
    a first plurality of cells operating in accordance with a first mode and a second plurality of cells operating in accordance with a second mode, each of said cells being served by a respective first station, at least one second station configured to establish an active connection with at least one first station; and
    a selecting unit configured to send information in a channel release message to said second station for selecting which at least one cell said second station is to camp on with when said second station changes to an idle state.

24. A system, comprising:
    a first plurality of cells operating in accordance with a first mode and a second plurality of cells operating in accordance with a second mode, each of said cells being served by a respective first station, at least one second station configured to establish an active connection with at least one first station, said at least one second station being associated with said first plurality of cells or said second plurality of cells during said active connection; and
    a selecting unit configured to send information in a channel release message to said second station for selecting if the second station is to camp on at least one cell operating in accordance with the first mode or at least one cell operating in accordance with the second mode, when said second station changes to an idle state after said connection has been released.

25. A method, comprising:
    establishing an active connection between a second station and at least one first station, said second station being configured to receive information for selecting if the second station is to be associated with a cell operating in accordance with a first mode or a second mode, each of said cells being served by a respective first station;

releasing the active connection between the first and second station; and sending a connection release message to the second station indicating if the second station is to camp on a cell operating in accordance with the first mode or the second mode when said second station changes to an idle state.

26. A method, comprising: establishing an active connection between at least one first station and a second station, said at least one second station being associated with a cell during said connection; and sending in a connection release message information to said second station for selecting which cell said second station is to camp on when said second station changes to an idle state after said active connection has been released.

27. An apparatus, comprising:

a connection unit configured such that an active connection with at least one first station is provided, said second station being associated with a first cell during said active connection; and a receiver configured to receive information in a connection release message, for selecting which plurality of cells said second station is to camp on with when said second station changes to an idle state.

28. The apparatus as claimed in claim 27, wherein said information comprises information at least one of cell, local area, radio access technology, network and band.

29. A system, comprising:

a plurality of cells, each of said cells being served by a respective first station;

at least one second station configured such that an active connection with at least one first station is provided;

said at least one second station being associated with a first cell during said active connection; and a selecting unit configured to send information in a connection release message to said second station for selecting which cell said second station is to camp on when said second station changes to an idle state after said active connection has been released.

30. The system as claimed in claim 29, wherein said system comprises a first plurality of cells and a second plurality of cells, said system selecting which plurality of cells the second station is to camp on in the idle mode.

31. The system as claimed in claim 29, wherein said cell is selected based on one or more of the following:

identify of the second station; geographical location of said second station; measurement reports; cell information; and the capability of said second station such as the frequency bands and/or radio access technologies the second station supports.

32. The system as claimed in claim 30, wherein said selecting unit is configured to send a message to said second station identifying if the second station is to camp on a cell of the first plurality of cells or a cell of the second plurality of cells.

33. The system as claimed in claim 29, wherein said selecting unit is configured to cause a message to be transmitted to said second station indicating the cell said second station is to be associated and/or if the second station is to camp on a cell of a first plurality of cells or a cell of a second plurality of cells.

34. The system as claimed in claim 29, wherein in the absence of said connection release message, said second station is configured to camp on the cell with which the second station is associated with during the connection.

35. The system as claimed in claim 29, comprising at least one further network element, said network element comprising said selecting unit.

36. The system as claimed in claim 33, wherein said network element comprises a mobile services switching center and/or a serving mobile location center.

37. The system as claimed in claim 29, wherein said selecting unit is provided in said first station.

38. The system as claimed in claim 30, wherein the first plurality of cells is of a first network and the second plurality of cells is of a second network.

39. An apparatus, comprising:

an establishing means for establishing an active connection with at least one first station, said second station being associated with a first cell during said active connection; and receiving means for receiving information for selecting which plurality of cells said second station is to camp on when said second station changes to an idle state.

40. A method as claimed in claim 26, comprising sending information indicating which of a first plurality of cells and a second plurality of cells, the second station is to camp on in the idle mode.

41. A method as claimed in claim 26, comprising selecting said cell on which said second station is to camp on is based on one or more of the following:

identify of the second station; geographical location of said second station; measurement reports; cell information; and the capability of said second station such as the frequency bands and/or radio access technologies the second station supports.

42. A method as claimed in claim 26, comprising in the absence of said message, camping by second station on the cell with which the second station is associated with during the connection.

43. Apparatus as claimed in claim 27, wherein said receiver is configured to receive information indicating, which of a first plurality of cells and a second plurality of cells the second station is to camp on in the idle mode.

44. Apparatus as claimed in claim 27, wherein said apparatus comprises a mobile station.

* * * * *

UNITED STATES PATENT AND TRADEMARK OFFICE
CERTIFICATE OF CORRECTION

| | | |
|---|---|---|
| PATENT NO. | : 7,551,934 B2 | Page 1 of 1 |
| APPLICATION NO. | : 10/240677 | |
| DATED | : June 23, 2009 | |
| INVENTOR(S) | : Friman et al. | |

It is certified that error appears in the above-identified patent and that said Letters Patent is hereby corrected as shown below:

Column 13,

Claim 27, lines 3-4, change "second station" to --apparatus--
Claim 27, line 8, change "second station" to --apparatus--
Claim 27, line 9, change "second station" to --apparatus--

Column 14,

Claim 39, line 3, change "second station" to --apparatus--
Claim 39, line 7, change "second station" to --apparatus--
Claim 39, line 8, change "second station" to --apparatus--
Claim 43, lines 3-4, change "second station" to --apparatus--

Signed and Sealed this
Thirteenth Day of September, 2011

David J. Kappos
*Director of the United States Patent and Trademark Office*

UNITED STATES PATENT AND TRADEMARK OFFICE
CERTIFICATE OF CORRECTION

Page 1 of 1

PATENT NO. : 7,551,934 B2
APPLICATION NO. : 10/240677
DATED : June 23, 2009
INVENTOR(S) : Friman et al.

It is certified that error appears in the above-identified patent and that said Letters Patent is hereby corrected as shown below:

Column 13, lines 21-22 (Claim 27, lines 3-4) change "second station" to --apparatus--
Column 13, line 26 (Claim 27, line 8) change "second station" to --apparatus--
Column 13, line 27 (Claim 27, line 9) change "second station" to --apparatus--

Column 14, line 26 (Claim 39, line 3) change "second station" to --apparatus--
Column 14, line 30 (Claim 39, line 7) change "second station" to --apparatus--
Column 14, line 31 (Claim 39, line 8) change "second station" to --apparatus--
Column 14, lines 50-51 (Claim 43, lines 3-4) change "second station" to --apparatus--

This certificate supersedes the Certificate of Correction issued September 13, 2011.

Signed and Sealed this
Eleventh Day of October, 2011

David J. Kappos
*Director of the United States Patent and Trademark Office*

UNITED STATES PATENT AND TRADEMARK OFFICE
CERTIFICATE OF CORRECTION

PATENT NO. : 7,551,934 B2
APPLICATION NO. : 10/240677
DATED : June 23, 2009
INVENTOR(S) : Leif Friman et al.

It is certified that error appears in the above-identified patent and that said Letters Patent is hereby corrected as shown below:

In the claims:

Claim 23, Column 12, Line 45
Please change "with when said second station changes to an idle state." to
--when said second station changes to an idle state.--

Claim 27, Column 13, Line 26
Please change "cells said second station is to camp on with when said" to
--cells said second station is to camp on when said--

Signed and Sealed this
Second Day of February, 2016

Michelle K. Lee
*Director of the United States Patent and Trademark Office*

UNITED STATES PATENT AND TRADEMARK OFFICE
CERTIFICATE OF CORRECTION

PATENT NO. : 7,551,934 B2  
APPLICATION NO. : 10/240677  
DATED : June 23, 2009  
INVENTOR(S) : Leif Friman et al.

Page 1 of 1

It is certified that error appears in the above-identified patent and that said Letters Patent is hereby corrected as shown below:

Title Page, please insert item

-- (30) Foreign Application Priority Data

May 22, 2000 (GB) 0012355.4

April 3, 2000 (GB) 0008121.6 --

Signed and Sealed this  
Fifth Day of April, 2016

Michelle K. Lee  
*Director of the United States Patent and Trademark Office*